(12) United States Patent
Church

(10) Patent No.: US 7,690,697 B2
(45) Date of Patent: *Apr. 6, 2010

(54) THREAD FORM FOR TUBULAR CONNECTIONS

(75) Inventor: Kris L. Church, Montgomery, TX (US)

(73) Assignee: Gandy Technologies Corp., Conroe, TX (US)

( * ) Notice: Subject to any disclaimer, the term of this patent is extended or adjusted under 35 U.S.C. 154(b) by 293 days.

This patent is subject to a terminal disclaimer.

(21) Appl. No.: 11/746,438

(22) Filed: May 9, 2007

(65) Prior Publication Data

US 2008/0277933 A1    Nov. 13, 2008

(51) Int. Cl.
*F16L 25/00* (2006.01)
*F16L 35/00* (2006.01)

(52) U.S. Cl. .................. 285/334; 285/333; 285/390

(58) Field of Classification Search ............ 285/333, 285/334, 390; 411/423, 366.1
See application file for complete search history.

(56) References Cited

U.S. PATENT DOCUMENTS

| | | | | |
|---|---|---|---|---|
| 1,218,359 A * | 3/1917 | Beatty | ............ | 285/123.1 |
| 4,549,754 A * | 10/1985 | Saunders et al. | ............ | 285/334 |
| 4,600,224 A | 7/1986 | Blose | ............ | 285/334 |
| 5,154,452 A * | 10/1992 | Johnson | ............ | 285/333 |
| 5,769,466 A | 6/1998 | Noel et al. | ............ | 285/332 |
| 5,782,503 A * | 7/1998 | Noel et al. | ............ | 285/94 |
| 6,174,001 B1 | 1/2001 | Enderle | ............ | 285/334 |
| 6,254,146 B1 * | 7/2001 | Church | ............ | 285/334 |
| 6,270,127 B1 | 8/2001 | Enderle | ............ | 285/334 |
| 6,322,110 B1 * | 11/2001 | Banker et al. | ............ | 285/334 |
| 6,722,706 B2 | 4/2004 | Church | ............ | 285/334 |
| 6,832,789 B2 | 12/2004 | Church | ............ | 285/333 |
| 6,851,727 B2 | 2/2005 | Carcagno et al. | ............ | 285/333 |
| 7,246,979 B2 * | 7/2007 | Fujii et al. | ............ | 411/310 |
| 2006/0108803 A1 * | 5/2006 | Reynolds, Jr. | ............ | 285/334 |
| 2006/0145477 A1 | 7/2006 | Reynolds, Jr. | ............ | 285/333 |
| 2006/0214421 A1 * | 9/2006 | Muradov | ............ | 285/333 |
| 2007/0063517 A1 * | 3/2007 | Pallini et al. | ............ | 285/390 |
| 2007/0236014 A1 * | 10/2007 | Reynolds et al. | ............ | 285/334 |
| 2008/0012321 A1 * | 1/2008 | Roussie | ............ | 285/334 |

* cited by examiner

*Primary Examiner*—Daniel P Stodola
*Assistant Examiner*—Robert Williams
(74) *Attorney, Agent, or Firm*—Charles D. Gunter, Jr.

(57) ABSTRACT

A thread form is shown which is used to make a threaded pipe connection capable of being screwed together and subsequently unscrewed. A pin member is provided having external threads with stab flanks and load flanks and flat crests and roots for mating with the mating internal threads of a box member to make up a pipe connection. One of the stab or load flanks is made up of two facets and three radii. The other selected flank is made up of three facets and four radii, giving it irregular features forming a complex geometric profiles. The thread form can be used to form a premium threaded connection which is used with such tubulars as casing and tubing for oil, gas, water and waste disposal wells.

10 Claims, 10 Drawing Sheets

THREAD FORM FOR TUBULAR CONNECTIONS

BACKGROUND OF THE INVENTION

1. Field of the Invention

The present invention relates to a thread form for threaded connections of the type used for securing tubular flow conduits to form a desired continuous flow path.

2. Description of the Prior Art

A variety of threaded connections are known in the prior art for joining tubular flow conduits in an end-to-end relationship to form a continuous flow path for transporting fluid. Typical examples of such flow conduits include casing, expandable casing, tubing, drill pipe and risers for oil, gas, water and waste disposal wells, and in horizontal and trenchless drilling applications. In the case of oil field casing and tubing, it is a common practice to use metal pipes of a definite length, with sections of pipe joined to form a string. The string of pipes effectively creates one lengthier pipe, intended to provide a means to reach the depth at which the reservoirs of gas or oil are found in order for extraction to the surface.

The pipe sections are secured together at their ends by an externally threaded connector, or "pin" that is threadedly received within an internally threaded connector or "box". Typically, each pipe section has a pin on one pipe end and a box at the opposite pipe end. Some pipe has an internally threaded coupling secured to one end of a double pin pipe section to produce the box. The individual pipe sections are frequently referred to as a "pipe joint". Tubing and casing pipe joints are usually 30 ft. in length but can vary in length from 20 ft. to 40 ft. or longer.

The various pipe strings used in constructing a well are usually assembled on the floor of a drilling or workover rig. The pipe string is lengthened and lowered into the well as succeeding pipe joints are added to the string. During this assembly procedure, the pipe joint being added to the string is lowered, pin down or pin up, into an upwardly or downwardly facing box projecting from the drilling rig floor. This procedure is commonly referred to as "stabbing" the pin into the box. After being stabbed, the added pipe joint is rotated to engage the threads of the pin and box, securing the joint to the string. The process is basically reversed in or to "destab" or disassemble the pipe string. Once free of the box, the removed joint is moved to a storage location.

There have been numerous advances in thread technology of the type under consideration in recent years. For example, Re. Pat. No. 30,647 issued to Blose in 1981 disclosed a tubular connection having a thread form which provided an unusually strong connection while controlling the stress and strain in the connected pin and box members of the connection. The thread form featured mating helical threads which were tapered in thread width in opposite directions to provide wedge-like engagement of the opposing flanks to limit rotational make-up of the connection. The wedge thread, if properly designed, provides high torsional resistance without inducing axial or radial stresses into the tubular connection upon make-up of the joint, making it easier to break out the joints if this becomes necessary. By reducing axial or radial stresses in the threaded connection, a sounder connection is theoretically provided which is able to withstand a greater level of operating stress and strain.

U.S. Pat. No. 4,600,224, issued Jul. 15, 1986 to Blose was a refinement and further improvement to the basic wedge thread concept. In the invention disclosed in the '224 patent, a connection was shown having a "chevron" load flank. Radial make-up of the threaded connection was controlled by the special thread structuring where the radial movement of a thread into a mating thread groove was restricted by a chevron type interfit between two load bearing thread surfaces of the threaded connection instead of relying upon thread width alone.

Re. Pat. No. 34,467 issued Dec. 7, 1992 to Reeves purported to be an improvement to the basic Blose wedge thread design. As explained by the patentee, when Blose's connection is rotatably made up to engage both the front and back thread load flanks, incompressible thread lubricant or other liquid may be trapped between the engaged load flanks. This trapped thread lubricant can resist the make-up torque and give a false torque indication that results in lower than desired stress and strain being induced in the Blose connection and reducing the design strength and load carrying capacity. The invention described in Re. Pat. No. 34,467 purports to preclude the possibility of false indication of torque by excluding thread lubricant from between the thread load flanks that are brought into engagement at make-up.

In Re. Pat. No. 30,647 and Re. Pat. No. 34,467, the preferred threads were "dovetailed-shaped" in cross section, being wider at the crests than at the roots. U.S. Pat. No. 4,600,224 was a departure from the Reeves designs in that a semi-dovetail or partial dovetail thread was disclosed. However, the thread crest width continued to be greater than the thread root width as in the traditional definition of the term "dovetail."

U.S. Pat. Nos. 6,254,146 and 6,722,706, to Kris L. Church, were directed to further improvements in thread forms of the type under consideration. The thread forms shown in these earlier Church patents include a special thread structuring where the radial movement of one thread into a mating thread groove is controlled by a complex profile interfit between the two mating thread surfaces of the threaded connection. The complex profile can be present on the stab flank, on the load flank, or on a combination of the two flanks. A controlled clearance is provided between the mating crests of the interengaged threads to prevent hydraulic pressure buildup caused by entrapped lubricant between the thread crests and roots. The stab and load flanks complex profiles are preferably multi-faceted flanks, each having at least three facets and four radii per flank. The pin thread crests have a crest width and the pin roots have a root width. The width of the crest is less than the width of the roots, which is exactly opposite that of the general dovetail design.

Despite the improvements in thread form design discussed above, a need continues to exist for a thread form which is capable of coupling tubular pipe sections quickly and efficiently, which forms a secure connection, and which is economical to produce.

A need also exists for such a thread form which provides a more versatile design than existing designs and which achieves different purposes depending on the end application, such as providing a female connector which is easier and faster to machine without losing the desired performance criteria, such as would be useful in an expandable casing connector.

A need also exists for an improved thread form for the coupling of tubular pipe sections that allows machining more threads per inch during manufacture, thereby providing shorter overall connections in some forms than were previously possible.

A need also exists for an improved thread form having a facet geometry which can be fashioned in such a way that the threads plastically collapse in height, creating an improved interlocking configuration for use, for example, in an expandable tubular process.

A need also exists for such an improved thread form which alternatively can be designed so that the thread height is very resistant to thread height plastic collapse, such as would be useful in a drill pipe tool joint or a upset workover connection.

A need also exists for such a thread form which can be designed with relatively small thread height, for example, for use on non-upset threaded tubulars with high axial and tension and compression abilities.

A need also exists for such an improved thread form which offers radial and diametrical stress control for services that require connections to have low or controlled stresses throughout the connection length.

SUMMARY OF THE INVENTION

The present invention has as its object to provide a further modification of the basic thread forms discussed above which provides improved design characteristics and performance over the prior art and which meets the variously enumerated needs of the prior art discussed above.

The thread forms of the invention can be used for making a threaded pipe connection capable of being screwed together and subsequently unscrewed. The thread forms are used on a connection which includes a pin member having external threads with stab flanks and load flanks and flat crests and roots for mating with the mating internal threads of a box member to make up a pipe connection. In one preferred form of the invention, the pin member is a generally cylindrical, externally threaded member with the external threads on the load flanks each being made up of two facets and three radii. The external threads on the stab flanks of the pin member, on the other hand, have irregular flank features, the irregular features comprising three facets and 4 radii for each of the stab flanks.

The thread form of the invention is further characterized by having a given overall thread height which is measured between the thread crests and roots. The variously described thread facets each has a radial height measured in the same direction as the overall thread height. In one form of the invention, one of the facets on the stab flank has a radial height which is less than the radial height of the remaining two facets. In one form of the invention, the threads again have a given overall thread height measured between the thread crests and roots, and wherein the various thread facets each has a radial height measured in the same direction as the thread height, and wherein the radial height of the load flank facets are approximately equal.

The pin member has a central longitudinal axis and the thread roots and crests are preferably parallel to the central longitudinal axis. However, different design criteria may dictate that the roots and crests be parallel to a particular taper. The preferred configuration of the thread form of the invention is a diametrically tapered wedge thread. However, a cylindrical connection could also be designed. The wedge thread design can have two thread cutting tapers, or more, if desired. The thread form of the invention can be used to form a threaded connection for tubulars which include, for example, oil, gas, construction, water and waste disposal well casing and tubing.

Additional objects, features and advantages will be apparent in the written description which follows.

DETAILED DESCRIPTION OF THE INVENTION

Figure 1:
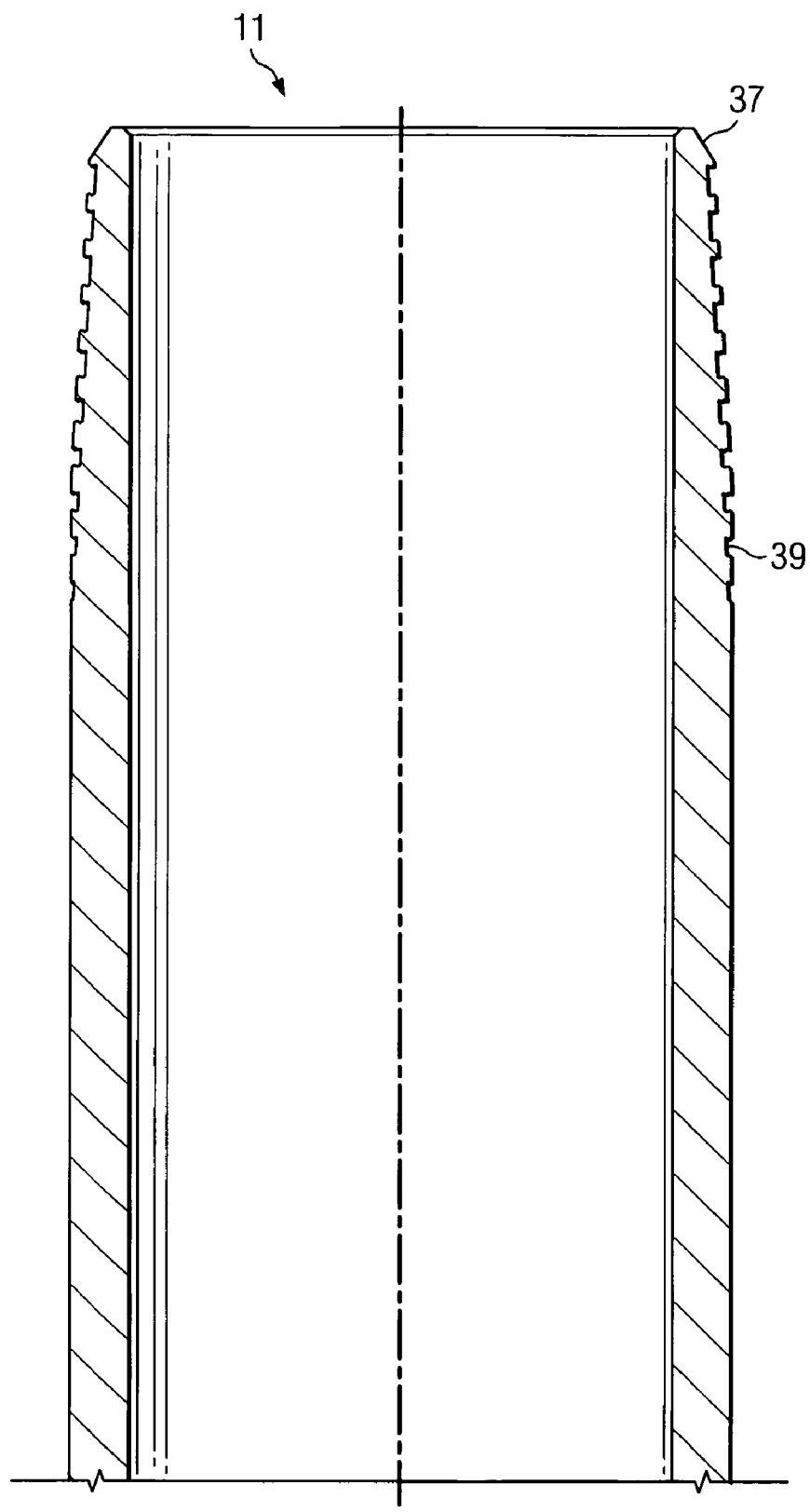
FIG. 1 is a side, cross-sectional view of the pin end of a section of pipe employing the thread form of the invention.

For simplicity sake, the invention will be described in terms of a section of oil field casing. Turning to FIG. 1 of the drawings, there is shown a cross sectional view of a pin end 11 of a section of tubular pipe, such as a section of oil field casing, employing the thread form of the invention. Although only the pin end of the connection is shown, it will be understood that the pin end is intended to be made up with a mating box end to form the pipe connection. As has been discussed, the thread forms of the invention can also be applied to a wide variety of tubular goods. Typical applications could include, but are not limited to, oil and gas offshore and onshore sub surface casing, intermediate casing, production casing, expandable casing, work over tubing, production tubing, tiebacks, risers, pile driving casing, line pipe, drill pipe, TNT pipe, flush joints, HDD pipe, water well pipe, liners for constructions, mining pipe, and disposal wells. Also, those skilled in the art will understand that the thread forms of the invention can be used in a variety of known types of pipe connections, including connections which are swaged, expanded, upset or non-upset and can be tapered or "cylindrical", non-tapered connections. The thread forms of the invention can also be used in connections which are helically structured as wedge threads such as those described in Blose Re. Pat. No. 30,647 and Reeves Re. Pat. No. 34,467.

Figure 2A:
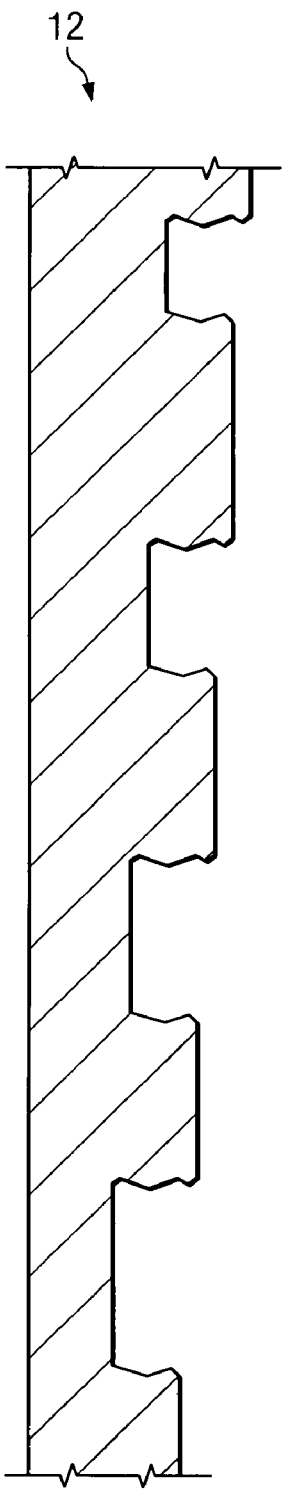
FIGS. 2A and 2B are partial, quarter-sectional views of the box and pin members, respectively, of one version of the thread form of the invention, the members being spaced apart for ease of illustration and showing the mating threaded surfaces of the connection.
Figure 2B:
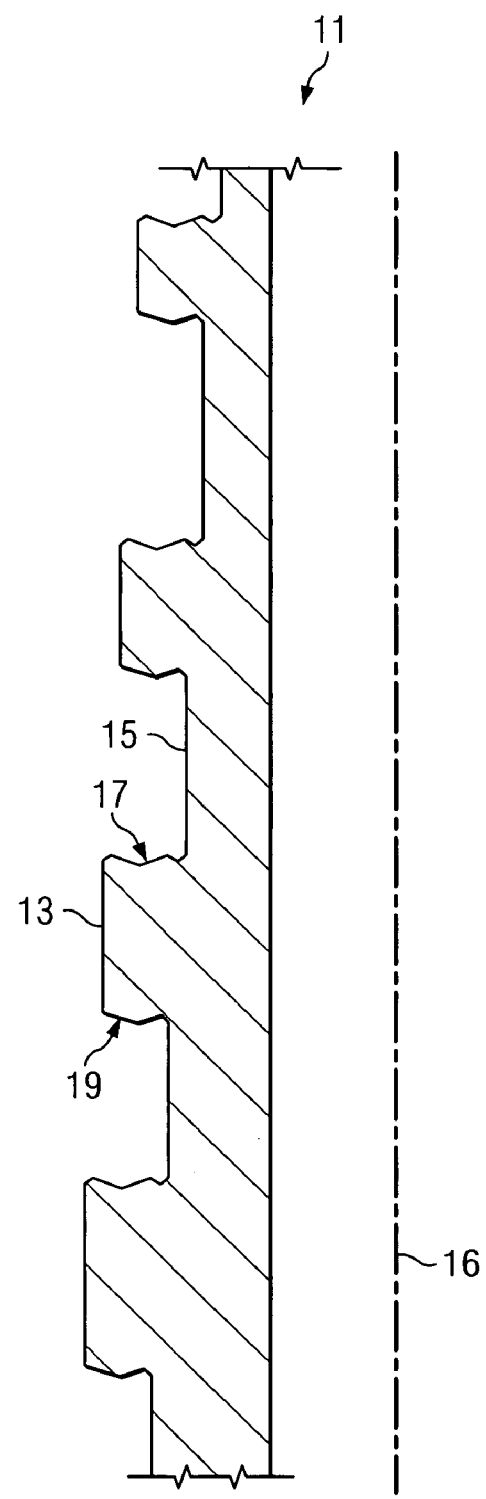

FIGS. 2A and 2B show one thread form of the invention in greater detail. As shown in FIG. 2B, the pin end 11 of the tubular member has pin threads with thread crests 13 and thread roots 15. The crests 13 and roots 15 of the pin end 11 are adapted to be made up with a mating box end 12 (FIG. 2A), having a complimentary thread structure. The box end 12 is essentially a mirror image of the pin end. The pin thread crests 13 are formed between a stab flank 17 and a load flank of the pin thread. The thread crests 13 are approximately parallel to the thread roots 15 and to the horizontal axis 16 of the generally cylindrical or diametrically tapered tubular pin end 11.

As used herein, the term "load flank" will be understood to designate that sidewall of a thread that faces away from the outer end from the respective male or female member on which the thread is formed, and the term "stab flank" will be understood to refer to that sidewall surface that faces toward the outer end of the respective male or female member. With respect to the thread shown in FIG. 2B, the pin mouth or outer end would be located toward the right as viewed in FIG. 2.

Figure 3:
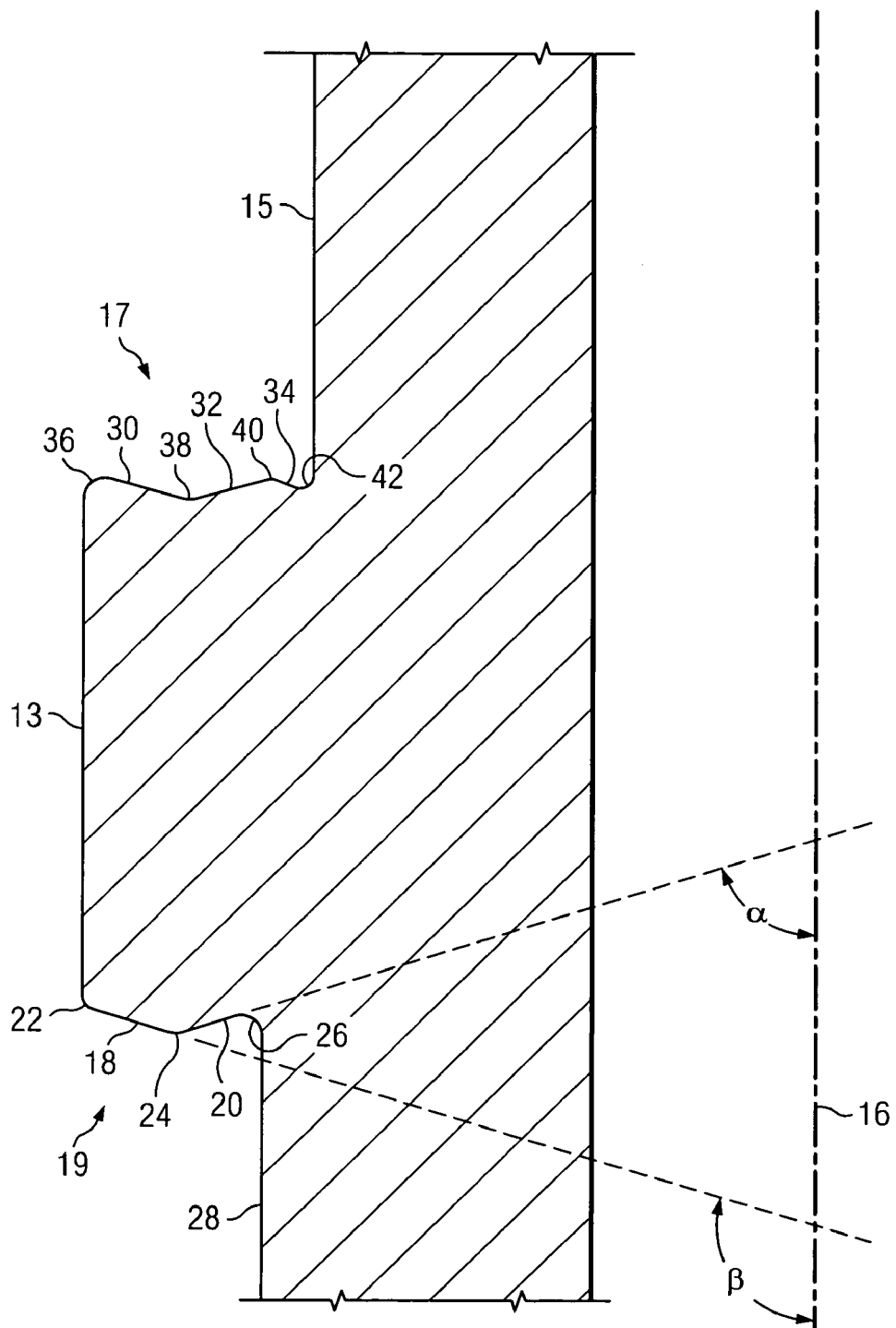
FIG. 3 is an isolated, quarter sectional view of one pin thread of the thread form of the invention showing the various features of the geometry of the thread.

FIG. 3 is an isolated quarter sectional view of a single thread on the pin end 11. As shown in FIG. 3, the stab flanks 17 and load flanks 19 of the thread form of the invention are each designed to form a mating interfit between the two mating thread surfaces of the pin end and box end of the threaded connection. In the form of the invention illustrated in FIG. 3, the load flank 19 includes two facets 18, 20 and three radii 22, 24, 26. By "facet" is meant one of the exposed, flat, planar surfaces of the respective thread flank between the thread crest 13 and thread root 15. In other words, the term "facet" is intended to mean a surface similar to the angled cut surface which makes up the polished surface of a diamond. By "radii" is meant the fillet or corner radius tangent to the facet and/or the roots and crest illustrated as 22, 24 and 26 in FIG. 3.

It will be observed, with respect to FIG. 3, that the facet 20 forms a negative angle alpha, sometimes referred to as a "hook," with respect to the thread root 28 and to the horizontal axis of the pipe 16. By "negative" angle is meant that the angle formed between the facet 20 and the adjacent thread root surface 28 is an acute angle whereby the facet 20 flares or leans inwardly toward the thread root 28. In like fashion, the facet 18 forms a positive or obtuse angle beta with respect to the surface 28.

With further reference to FIG. 3, it will be observed that the stab flank 17 is comprised of three facets 30, 32, 34 and four radii 36, 38, 40, 42. It will also be observed that facet 30 is parallel with generally to facet 18 on the load flank, i.e., it is inclined in the same relative direction. Thus, the facets 18 and 30 both lean in the same relative direction with respect to a horizontal axis 16, when viewed in profile. In similar fashion, facet 32 on the stab flank 17 is parallel with generally to the facet 20 on the load flank. However, note that the stab flank 17 includes an additional facet 34 (FIG. 3) which is inclined to form a negative or acute angle with respect to the adjacent thread root 15.

Figure 4:
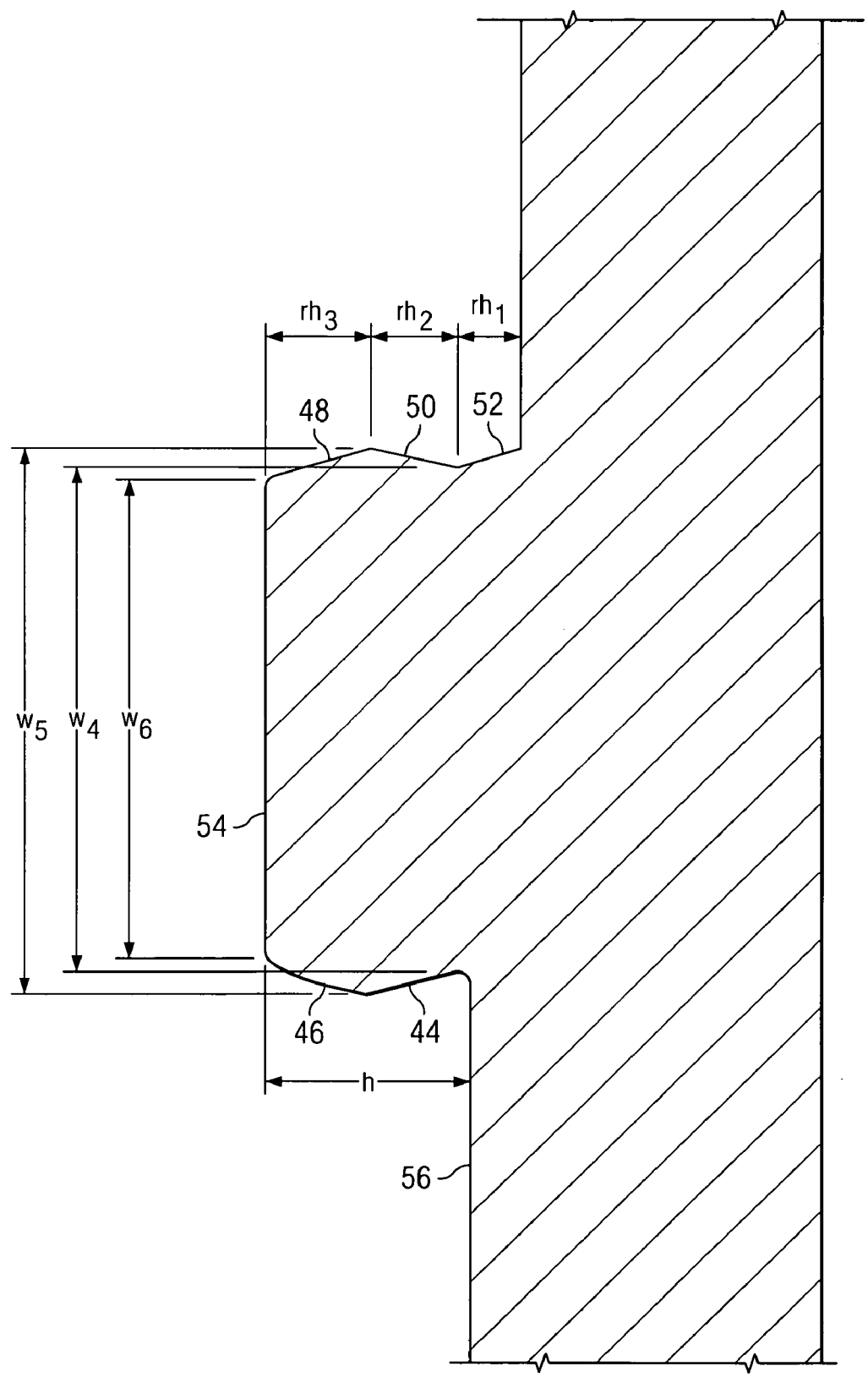
FIGS. 4-10 are views similar to FIG. 3, but showing alternative versions of the pin thread form of the invention in which a selected one of the stab and load flanks has two facets and three radii and the other one of the stab and load flanks has three facets and four radii.

Turning to FIG. 4, there is illustrated another thread form embodying the principles of the invention. The thread form illustrated in FIG. 4 again has facets 44, 46 on the load flanks which are identical to the facets 18 and 20 of the load flanks of the previously described thread form of FIG. 3. However, in the case of the thread form of FIG. 4, the three facets 48, 50, 52 of the stab flank are all oppositely oriented, i.e., form a mirror image, with respect to the facets 30, 32, 34 of the stab flanks of the thread form of FIG. 3. Note that the threads all have a given overall thread height ("h" in FIG. 4) measured between the thread crests and roots 54, 56, and wherein the various thread facets each has a radial height (illustrated as "rh1", "rh2", and "rh3" in FIG. 4) measured in the same direction as the thread height. It can be seen that in the embodiment of the invention illustrated in FIG. 4, the bottom facet 52 on the stab flank has a radial height "rh1" which is less than the radial height of the remaining two facets, rh2 and rh3. It will also be seen in the form of the invention illustrated in FIG. 4 that the radial heights of the facets 44,46 of the load flank are approximately equal.

Figure 5:
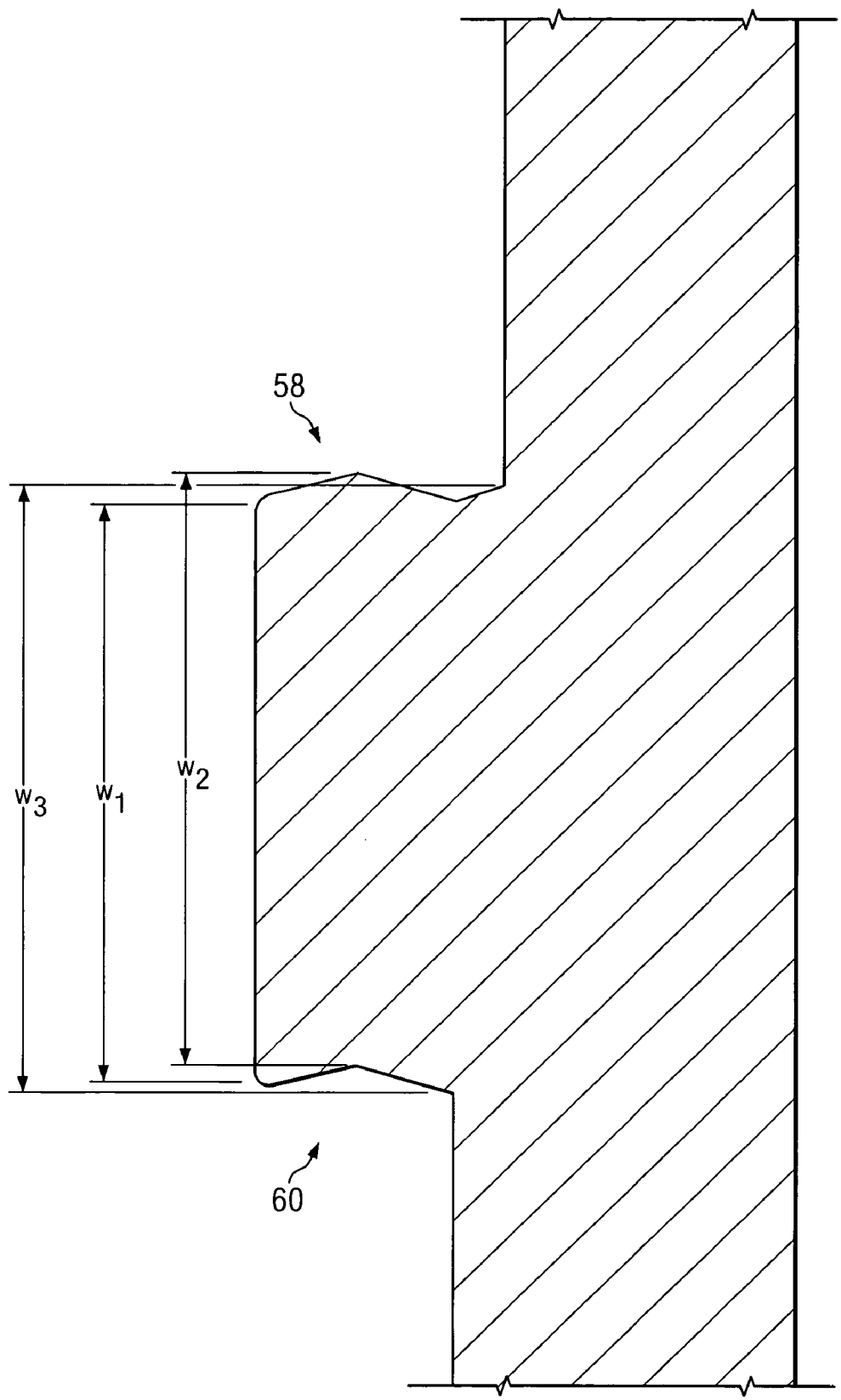

FIG. 5 illustrates another version of the improved thread form of the invention. The thread form illustrated in FIG. 5 has stab flanks 58 which are identical to the stab flanks of the previously described thread form illustrated in FIG. 4. However, the load flanks 60 of the thread form of FIG. 5 are exactly opposite or mirror images of the load flanks 44, 46 illustrated in FIG. 4. The thread form illustrated in FIG. 5 also shows the various thread widths "w1", "w2", and "w3", and how each width for the thread form illustrated in FIG. 5 is equal. However, a similar comparison to the thread form of FIG. 4 shows that the thread widths "w4", "w5", and "w6" vary, depending upon the point along the thread height at which the measurement is taken. In other words, the width "w5" is greater than either thread width "w4" or "w6." The thread widths of the thread form of the invention have unique characteristics which give the thread forms of the invention more versatility than the designs of the prior art.

Figure 6:
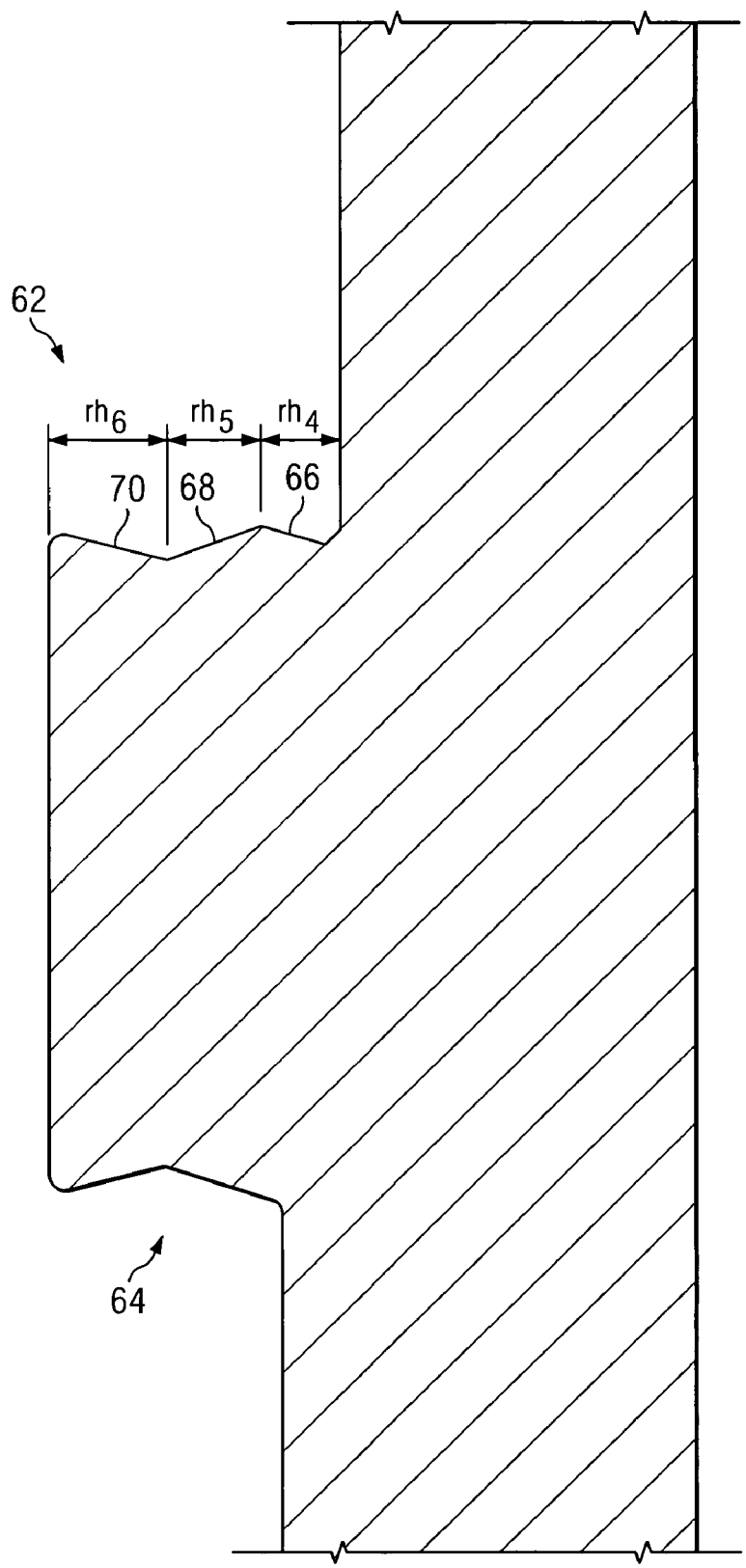

In another version of the present thread form design illustrated in FIG. 6, the load flanks 64 are identical to the load flanks 60 of FIG. 5. However, the stab flanks 62 are opposite, i.e., mirror images of the stab flanks 58 of the thread form of FIG. 5. Note also the relative heights of the various facets 66, 68, 70, with the bottom facet 66 having a shorter relative height.

Figure 7:
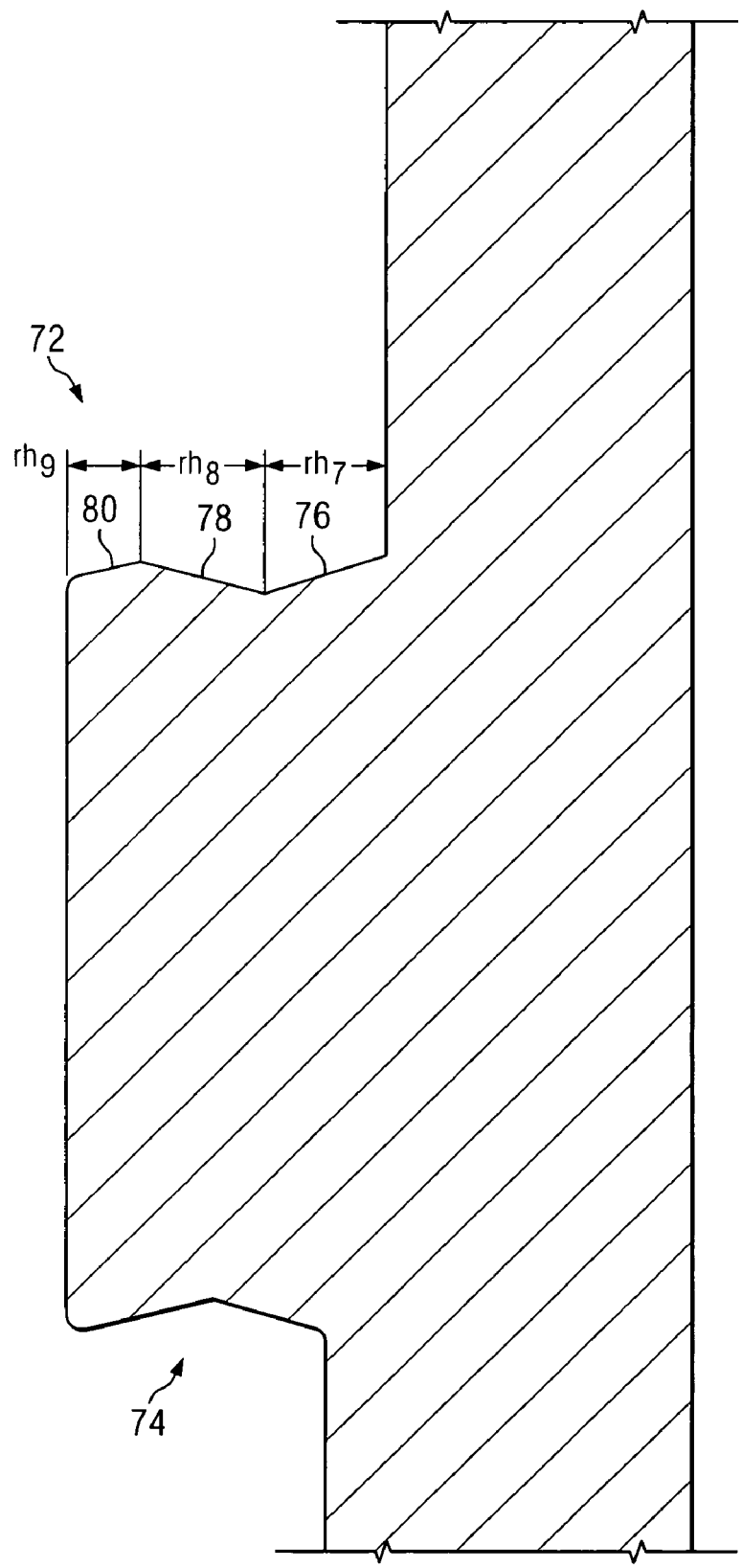

In another version of the present thread form illustrated in FIG. 7, the load flanks 74 are identical to the load flanks 64 of FIG. 6. However, the stab flanks 72 are "inverted" in that the top facet 80 has a shorter relative height than the remaining facets 76 and 78, with reference to the facet heights 76, 68 and 80 in FIG. 7.

Figure 8:
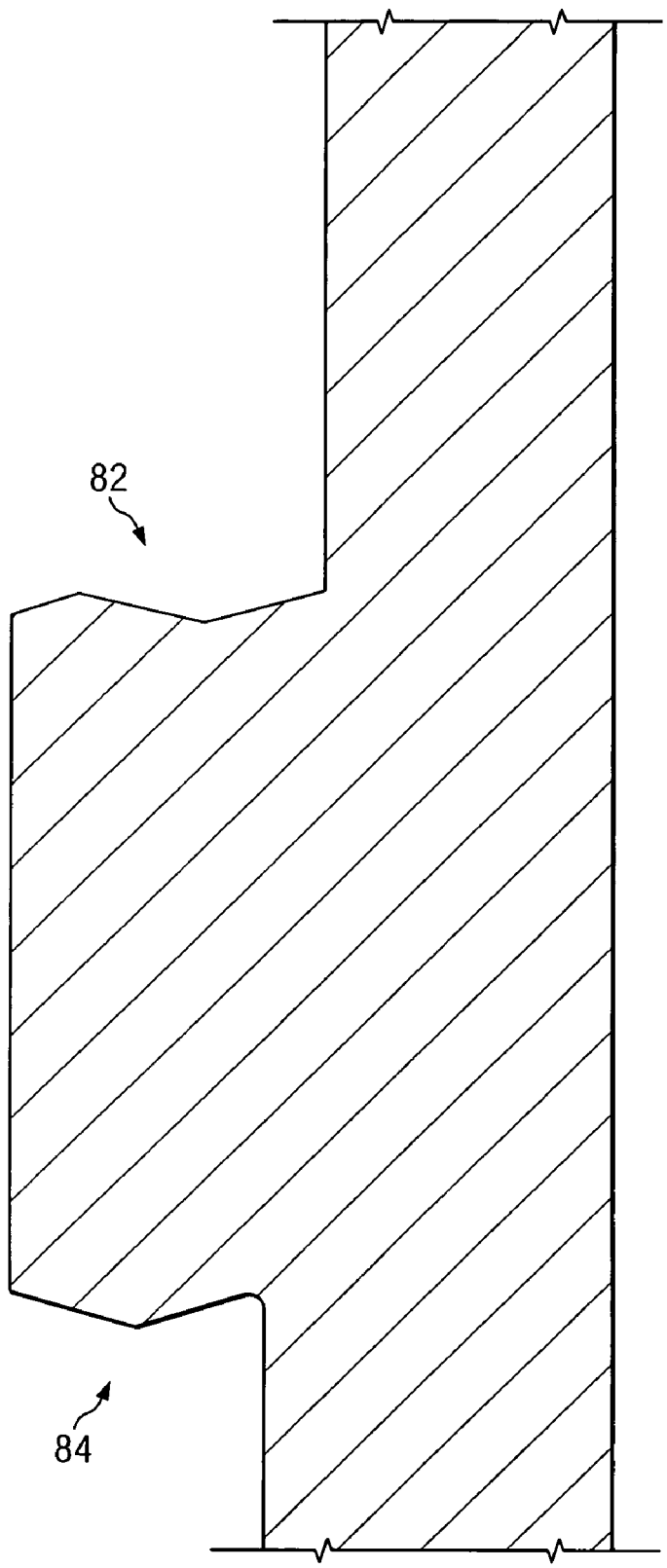
Figure 9:
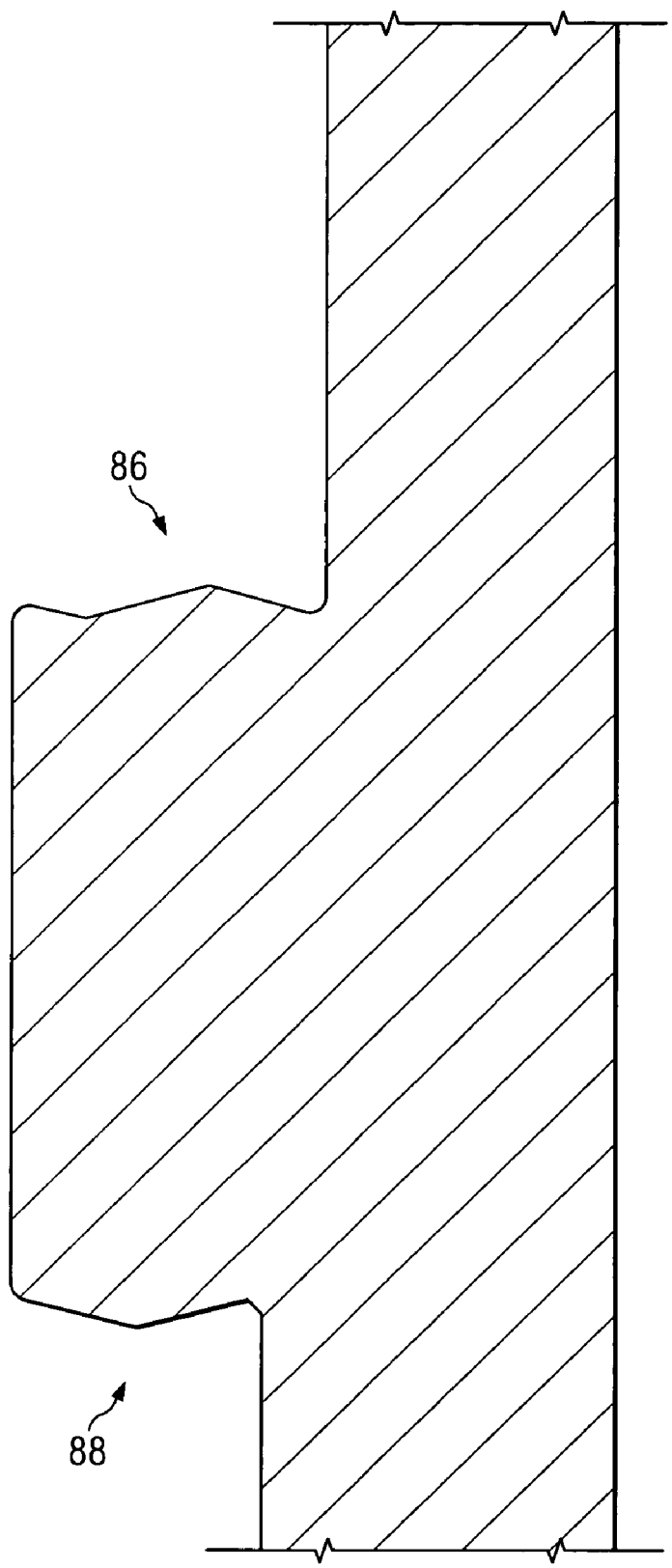
Figure 10:
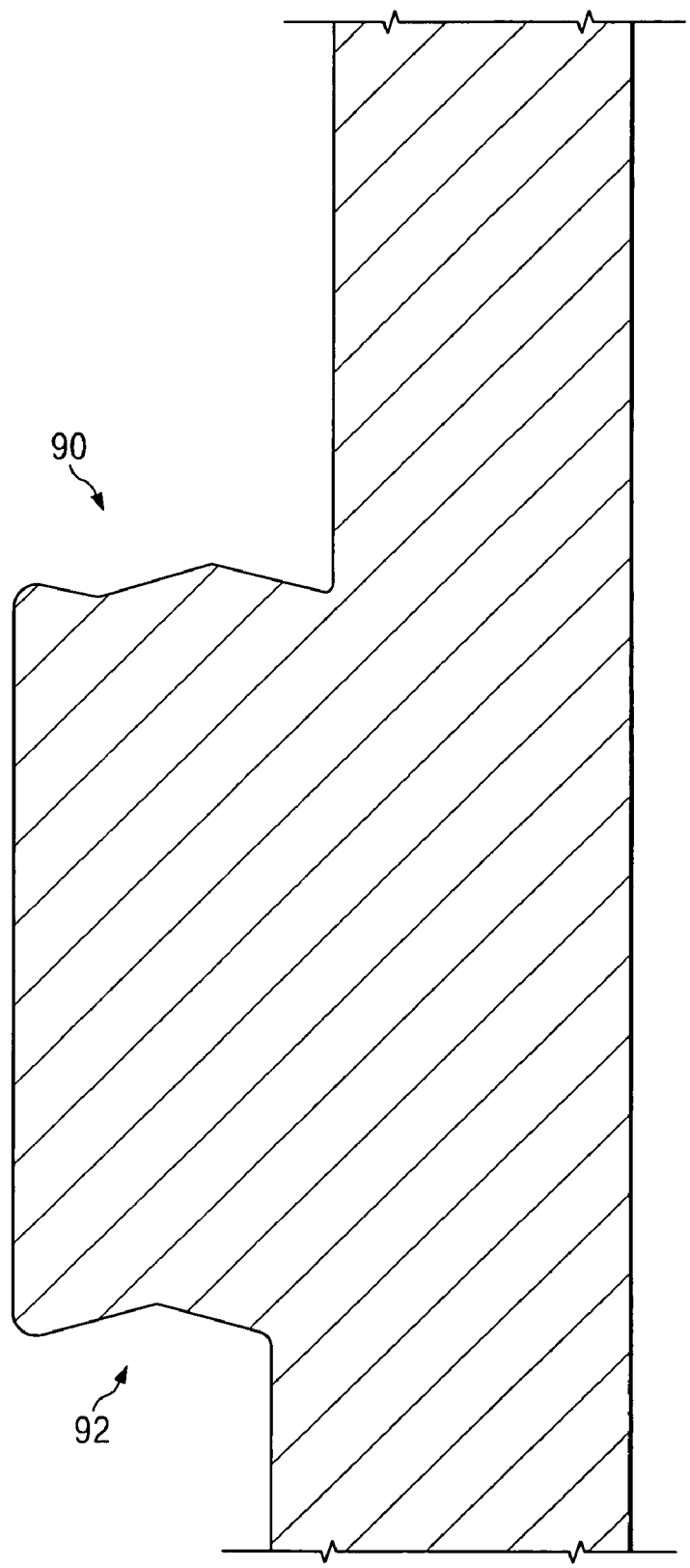

FIGS. 8-10 illustrate yet additional versions of the thread form of the invention. For example, in FIG. 8, the stab flanks 82 are identical to the stab flanks 72 in FIG. 7. However, the load flanks are reversed or mirror images of the load flanks 74 in the thread form illustrated in FIG. 7. FIGS. 9 and 10 illustrate further variations in the stab and load flanks, 86, 88 and 90, 92, respectively of the various thread forms.

In some cases, the thread forms of the invention can be helically structured as a wedge. In other words, both the pin and box threads are machined as helical wedge threads and thus have progressively changing axial width along the helical length thereof. In other words, with reference to FIG. 1, the threads on the pin member end 11 could be machined so that the thread width of each successive thread progressively decreases from the inner extent 39 of the pin end along the helical length thereof to the outer extent 37 adjacent the mouth of the pin end. The axial thread width of the box end would progressively decrease in the opposite direction. The progressively changing axial width of the pin and box threads provides a wedging interfit to limit axial make-up of the tubular connection. Further details of "wedge" thread forms can be gained from the previously referenced Re. Pat. No. 30,647 issued to Blose in 1981, and similar references which will be familiar to those skilled in the art of thread form design.

With respect to FIGS. 1-10 it can be seen that, in total, eight different configurations of the thread forms of the invention have been presented. Also, for any particular configuration, the particular arrangement of the stab and load flanks could be reversed. In other words, for the most preferred configuration, the stab flanks will have three facets and four radii while the load flanks will have two facets and three radii. However, the design could be reversed so that the load flanks have three facets and four radii and the stab flanks have two facets and three radii.

In the most preferred form of the invention, one of the three facets will be shorter in height than the other two on the flank having three facets and four radii. However, it will be understood that all three facets could be designed to be of different heights in some configurations for stress distribution. The load flank facets are preferably the same height, but it will be appreciated that they could be designed to be different depending upon the design criteria needed in the connection performance. The preferred connection configuration is a diametrically tapered wedge thread. However, a cylindrical connection can conceivably be designed. In the preferred thread form, the thread roots and crests are parallel to the pipe axis. However, different design criteria may demand that the roots and crests be parallel to a particular taper. In the case of a wedge thread design, the wedge threads can have two thread cutting tapers, or more.

The improved thread form of the invention has particular application for use in the so-called "expanded casing" applications which have come into fairly wide spread use in recent years. Expanded casing is used in some well construction operations where it is found to be advantageous to radially plastically expand threaded pipe or casing joints in a drilled open hole or inside a cased wellbore. In a cased wellbore, radially expandable casing can be used to reinforce worn or damaged casing so as to, for example, increase a burst rating of the old casing, thereby preventing premature abandonment of the hole. In open hole sections of the wellbore, the use of radially expandable casing may reduce a required diameter of a drilled hole for a desired final cased hole diameter, and may also reduce a required volume of cement required to fix the casing in wellbore.

In conventional oilfield, water and waste disposal drilling, casing strings are installed at intervals whereby the casing for the next interval is installed through the casing for the previous interval. As a result, the outer diameter of a casing string is limited by the inner diameter of the previously installed casing string. Thus the casing strings in a conventional wellbore are nested relative to each other, with casing diameters decreasing in a downward direction. An annular space is typically provided between each string of casing and the wellbore so that cement may be pumped into the annular space or annulus to seal between the casing and the wellbore.

Because of the nested arrangement of the casing strings in a conventional wellbore, and the annular space required around the casing strings for cement, the hole diameter required at the top of the wellbore is relatively large. This large initial wellbore diameter may lead to increased costs due to the expense of large diameter casing, the expense of drilling large diameter holes, and the added expense of cementing a large casing string. Additionally, the nested arrangement of the casing strings in a conventional wellbore can severely limit the inner diameter of the final casing string at the bottom of the wellbore, which restricts the potential production rate of the well.

Thus, it may be desirable to radially expand a casing string "in situ" after it has been run into the wellbore through the previous casing string, so as to minimize the reduction of inner diameter of the final casing string at the bottom of the wellbore. Radially expanding a casing string in the wellbore has the added benefit of reducing the annular space between the drilled wellbore and the casing string, which reduces the amount of cement required to effect a seal between the casing and the wellbore.

The radial expansion can be achieved by a cold-forming expansion process in which an expansion tool or "pig" is moved through a casing string so as to radially plastically expand the casing string. One common prior-art expansion process uses a conically tapered, cold-forming expansion tool to expand casing in a wellbore. The expansion tool is generally attached to a lower end of a casing string that is run into the wellbore. The expansion tool also includes a cylindrical section having a diameter typically corresponding to a desired expanded inner diameter of a casing string. The cylindrical section is followed by a tapered section. After the casing string is set in place in the hole, an axial upward lifting force is exerted on the working string to force the expansion tool upward through the casing string so as to outwardly radial displace the casing string to a desired expanded diameter.

It will be appreciated from the foregoing that the thread forms utilized in expanded casing operations must be capable of securely joining the casing string and maintaining the integrity of the string so that the expansion operation does not significantly weaken the load carrying capacity of the threaded connection. During the expansion process, axial strains in standard prior art connections can cause the connection to fail. Alternatively, the efficiency of the connection (commonly defined as the ratio of a mechanical property of the pipe body, such as axial tension capacity, to the same mechanical property across the connection) may drop severely after casing expansion. The pipe body wall thickness is also generally reduced during the expansion process, thus reducing the mechanical properties of the pipe body itself. The improved thread profiles of the invention are ideally suited for use in expanded casing operations of the type described.

The assembly of a typical connection will be briefly discussed with respect to FIGS. 1-3 of the drawings. As has been explained, assembly of the pipe string normally involves a pipe joint being added to the existing string by lowering a section of pipe pin end down, into an upwardly facing box projecting from the drilling rig floor. After being stabbed into position, the added pipe joint is rotated to engage the threads of the pin and box, thereby securing the joint to the pipe string. The connections of the invention are generally free-running with the respective thread roots and crests, i.e., 13, 28 in FIG. 3, first making contact. Next in the order of assembly, the facet surfaces 30 and make contact with their respective counterparts in the box end. Finally, the facet surfaces 32, 34 and 18 make contact with their respective counterpart surfaces in the box end of the connection.

Another example of the sequence assembly is as follows: Firstly, the roots and crests 13, 28 are engaged solely to help round out an oval manufactured pin and/or box thread. Secondly, the facets 18, 32 engage and are interfering with the respective mating member, resulting in radial separation of the direction of stress that could develop in root and crest clearance. Thirdly, facets 20, 30 and would engage to lock the thread profile radially in place thereby controlling the hoop and radial stresses to a preferred or acceptable level.

The sequence of assembly is dependent upon the unique profile of the preferred design which is employed. Therefore, certain applications will demand the positive facets to engage before the negative facets. For example, when higher compressive radial stresses between the pin and box are required, the positive facets and the root and crests should not engage as much or not at all.

If the thread demands a plastic deformation subsequent to assembly, the flank or facet engagement sequence ans stress control can help the deformation of the thread form to flow in a predetermined configuration to help enhance the performance properties such as internal and external fluid or gas containment, axial tension and/or compression integrity, bending thru doglegs, breakout torque, and fatigue.

An invention has been provided with several advantages. Axial make-up of the threaded connection of the invention can be controlled by properly designing the profile engagement surfaces of the threads themselves. Radial make-up can be controlled by the special thread structuring where the radial movement of the thread making up into a mating thread groove will be restricted by the particular profile employed on both the stab flank and load flanks. By controlling the radial interfit between mating threads, lubricant entrapment can be controlled. Properly designing the thread profiles of the load and stab flanks causes balanced stresses when the threads are made up. The thread forms of the invention provide greater versatility in design than did the designs of the prior art.

The geometry of the facets can offer a female (box) connection which has easier and faster machining capabilities without losing the desired performance criteria, such as would be needed in an expandable casing connector. The facet geometry can be fashioned in a way that the threads plastically collapse in height creating an improved radially interlocking configuration. For example, this could be done by plastically tilting or bending the flanks, resulting in desired thread interlocking and/or pressure containment and/or increased bending performance and/or radial force interlocking improvement and/or tension/compression improvements. Plastic deformation of the threads can also be accomplished, for example, by the expandable tubular process described above.

Alternatively the thread geometry of the invention can also be designed so that the thread height is very resistant to thread height plastic collapse. A possible candidate for such a non-bending thread form design is a drill pipe tool joint or upset workover connection. Also the facets can be arranged to minimize any possible damage of the threads during stabbing operations which occur during pipe joint make up, making the connections of the invention especially economical for the drillers to use.

Half of the geometric thread form configurations which have been described provide give the ability for small thread heights which can be utilized for non upset threaded tubulars with high axial tension and compression abilities.

Half the configurations have a split dovetail which has a three point contact enabling a stabilizing effect to the other two reversed dovetails. This offers radial and diametrical stress control for services that require connections to have low or controlled stresses throughout the connection length.

While the invention has been shown in several of its forms, it is not thus limited, but is susceptibly to various modifications without departing from the spirit thereof.

What is claimed is:

1. A thread form for making a threaded pipe connection capable of being screwed together and subsequently unscrewed, the thread form comprising:

a pin end having external threads with stab flanks and load flanks and flat crests and roots for mating with the mating internal threads of a box end to make up a pipe connection, wherein the load flanks of the external threads are each made up of two facets and three radii, and wherein the stab flanks of the external threads each has irregular flank features, the irregular features comprising three facets and four radii for each of the stab flanks;

wherein the facets on the load flanks of the pin end comprise a radially outermost facet which lies in a parallel plane to a radially outermost facet on the stab flanks when viewed in cross section, and wherein the load flanks have a next radially inward facet which lies in a parallel plane to a next radially inward facet on the stab flanks, the stab flanks also having a further radially inward facet; and wherein the threads on the pin end have a given thread height measured between the thread crests and thread roots and wherein each of the various facets on the stab and load flanks has a radial height measured in the same direction as the thread height the combined facet heights defining a stab flank height on one side of the thread and a load flank height on an opposite side of the thread, and wherein the stab flank height is greater than the load flank height.

2. The thread form of claim 1, wherein the threads have a given thread height measured between the thread crests and roots, and wherein the various thread facets each has a radial height measured in the same direction as the thread height, and wherein one of the facets on the stab flank which is next adjacent the thread root has a radial height which is less than the radial height of the remaining two facets.

3. The thread form of claim 1, wherein the threads have a given thread height measured between the thread crests and roots, and wherein the various thread facets each has a radial height measured in the same direction as the thread height, and wherein the radial height of the load flank facets are approximately equal.

4. The thread form of claim 1, wherein the pin end has a central longitudinal axis, and wherein the thread roots and crests are parallel to the central longitudinal axis.

5. The thread form of claim 1, wherein the threads are cylindrical threads.

6. The thread form of claim 1, wherein the threads are diametrically tapered threads.

7. A make and break threaded pipe connection capable of being screwed together and subsequently unscrewed, the threaded pipe connection comprising:

a box end having internal threads with stab flanks and load flanks and flat roots and crests and a pin end having external threads with stab flanks and load flanks and flat crests and roots, the pin end being threadedly engaged with the box end to thereby form a pipe connection, and wherein the load flanks of the pin end are each made up of two facets and three radii, and wherein the stab flanks of the pin end each has irregular flank features, the irregular features comprising three facets and four radii for each of the stab flanks;

wherein the facets on the load flanks of the pin end comprise a radially outermost facet which lies in a parallel plane to a radially outermost facet on the stab flanks when viewed in cross section, and wherein the load flanks have a next radially inward facet which lies in a parallel plane to a next radially inward facet on the stab flanks, the stab flanks also having a further radially inward facet; and wherein the threads on the pin end have a given thread height measured between the thread crests and thread roots and wherein each of the various facets on the stab and load flanks has a radial height measured in the same direction as the thread height, the combined facet heights defining a stab flank height on one side of the thread and a load flank height on an opposite side of the thread, and wherein the stab flank height is greater than the load flank height.

8. A threaded pipe connection capable of being screwed together and subsequently unscrewed, the threaded pipe connection comprising:

a pin end having the thread form of claim 1, and a box end having internal threads with stab flanks and load flanks and flat crests and roots for mating with the mating external threads of the pin end to make up the pipe connection, wherein the load flanks of the internal threads are each made up of two facets and three radii, and wherein the stab flanks of the internal threads each has irregular flank features, the irregular features comprising three facets and four radii for each of the stab flanks;

wherein the facets on the load flanks of the box end comprise a radially outermost facet and a next radially inward facet and wherein the facets on the stab flanks comprise a radially outermost facet, a next radially inward facet and a further radially inward facet, wherein the radially outermost facet of the load flanks lies in a parallel plane to the next radially inward facet of the stab flanks when viewed in cross section and the next radially inward facet of the load flanks lies in a parallel plane to the further radially inward facet of the stab flanks; and wherein the threads on the box end have a given thread height measured between the thread crests and thread roots and wherein each of the various facets on the stab and load flanks has a radial height measured in the same direction as the thread height, the combined facet heights defining a stab flank height on one side of the thread and a load flank height on an opposite side of the thread, and wherein the stab flank height is greater than the load flank height.

9. A thread form for making a threaded pipe connection capable of being screwed together and subsequently unscrewed, the thread form comprising:

a pin end having external threads with stab flanks and load flanks and flat crests and roots for mating with the mating internal threads of a box end to make up a pipe connection, wherein the load flanks of the external threads are each made up of two facets and three radii, and wherein the stab flanks of the external threads each has irregular flank features, the irregular features comprising three facets and four radii for each of the stab flanks; and wherein the facets on the load flanks of the pin end comprise a radially outermost facet which lies in a parallel plane to a radially outermost facet on the stab flanks when viewed in cross section, and wherein the load flanks have a next radially inward facet which lies in a parallel plane to a next radially inward facet on the stab flanks, the stab flanks also having a further radially inward facet.

10. A thread form for making a threaded pipe connection capable of being screwed together and subsequently unscrewed, the thread form comprising:

a box end having internal threads with stab flanks and load flanks and flat crests and roots for mating with the mating external-threads of a pin end to make up a pipe connection, wherein the load flanks of the internal threads are each made up of two facets and three radii, and wherein the stab flanks of the internal threads each has irregular flank features, the irregular features comprising three facets and four radii for each of the stab flanks; and wherein the facets on the load flanks of the box end comprise a radially outermost facet which lies in a parallel plane to a radially outermost facet on the stab flanks when viewed in cross section, and wherein the load flanks have a next radially inward facet which lies in a parallel plane to a next radially inward facet on the stab flanks, the stab flanks also having a further radially inward facet.

* * * * *